US011709967B2

(12) United States Patent
Brenner et al.

(10) Patent No.: US 11,709,967 B2
(45) Date of Patent: Jul. 25, 2023

(54) DATA PROTECTION FOR NETWORKING DEVICES

(71) Applicant: EMC IP Holding Company LLC, Hopkinton, MA (US)

(72) Inventors: Adam Brenner, Mission Viejo, CA (US); Arun Murti, Mission Viejo, CA (US); Mark Malamut, Aliso Viejo, CA (US); Vijay Anand, Irvine, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 301 days.

(21) Appl. No.: 16/912,512

(22) Filed: Jun. 25, 2020

(65) Prior Publication Data

US 2021/0406403 A1 Dec. 30, 2021

(51) Int. Cl.
| | | |
|---|---|---|
| *G06F 21/64* | (2013.01) | |
| *H04L 9/40* | (2022.01) | |
| *G06F 21/60* | (2013.01) | |
| *G06F 21/57* | (2013.01) | |
| *G06F 21/55* | (2013.01) | |

(52) U.S. Cl.
CPC ............ *G06F 21/64* (2013.01); *G06F 21/552* (2013.01); *G06F 21/577* (2013.01); *G06F 21/604* (2013.01); *H04L 63/18* (2013.01)

(58) Field of Classification Search
CPC ...... G06F 21/64; G06F 21/552; G06F 21/577; G06F 21/604; H04L 67/5682; H04L 63/18
See application file for complete search history.

(56) References Cited

U.S. PATENT DOCUMENTS

| | | | | |
|---|---|---|---|---|
| 7,143,153 B1* | 11/2006 | Black | ............... | H04L 41/0816 709/224 |
| 2019/0332495 A1* | 10/2019 | Fair | ............... | G06F 16/1734 |
| 2019/0342258 A1* | 11/2019 | Raj | ............... | H04L 61/5007 |
| 2020/0351152 A1* | 11/2020 | Vidal | ............... | H04L 41/0893 |
| 2021/0075689 A1* | 3/2021 | Ramanathan | ............ | G06N 3/08 |

OTHER PUBLICATIONS

M. Sethi • K. Kannan • N. Sachindran • M. Gupta; Rapid Deployment of SOA Solutions via Automated Image Replication and Reconfiguration; 2008 IEEE International Conference on Services Computing (vol. 1, pp. 155-162); (Year: 2008).*
Sebastian Obermeier • Michael Wahler • Thanikesavan Sivanthi • Roman Schlegel • Aurelien Monot; Automatic attack surface reduction in next-generation industrial control systems; 2014 IEEE Symposium on Computational Intelligence in Cyber Security (CICS) (pp. 1-8); (Year: 2015).*
Claude Y. Laporte • Alain April; Software Configuration Management; Wiley-IEEE Press 2017 (Edition: 1, pp. 624); (Year: 2017).*

* cited by examiner

*Primary Examiner* — Luu T Pham
*Assistant Examiner* — Chao Wang
(74) *Attorney, Agent, or Firm* — Staniford Tomita LLP

(57) ABSTRACT

Embodiments are described for a method and system of applying data protection software mechanisms to network equipment devices to auto-discover the networking equipment, save changes from memory (TCAM) to local storage, backup changes to protection storage, provide auditing and tracking history of changes, and provide the ability to deploy test/development copies of changes using software defined networking techniques.

14 Claims, 7 Drawing Sheets

DATA PROTECTION FOR NETWORKING DEVICES

TECHNICAL FIELD

This invention relates generally to networking equipment, and more specifically to applying data protection methods to switches, routers, firewall and other network infrastructure devices.

BACKGROUND OF THE INVENTION

Networking equipment such as managed switches, core routers and firewall devices have important configuration data that is stored on each device. These configurations include network (e.g., VLAN) tags, per port activation/link speed, domain routing protocol (e.g., BGP/OSPF) settings, firewall rules, high availability/redundancy settings, and so on, and are generally critical to running a network. Most network equipment have a two phase commit process that must be followed for all changes. The first phase is to commit the settings to memory (typically ternary content addressable memory, TCAM) and the second phase is to save the changes to local persistent storage such that all settings are applied on power loss/reboot.

In a large network, the number of network equipment (infrastructure) devices could number in the thousands and be spread across multiple geographic locations. Moreover, such devices could be physical or virtual. There are several challenges customers and network operators face with regard to maintaining the configuration of such devices. These include: forgetting to commit changes to local persistent storage, needing to manually replicate changes to external systems in the event of unit malfunction/replacement, a lack of audit and history tracking, and lack of test/development use case enablement, among other similar issues.

What is needed, therefore, is a network management system that facilitates the storage and implementation of configuration and setting data for network equipment devices.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, Data Domain Boost, and Avamar are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
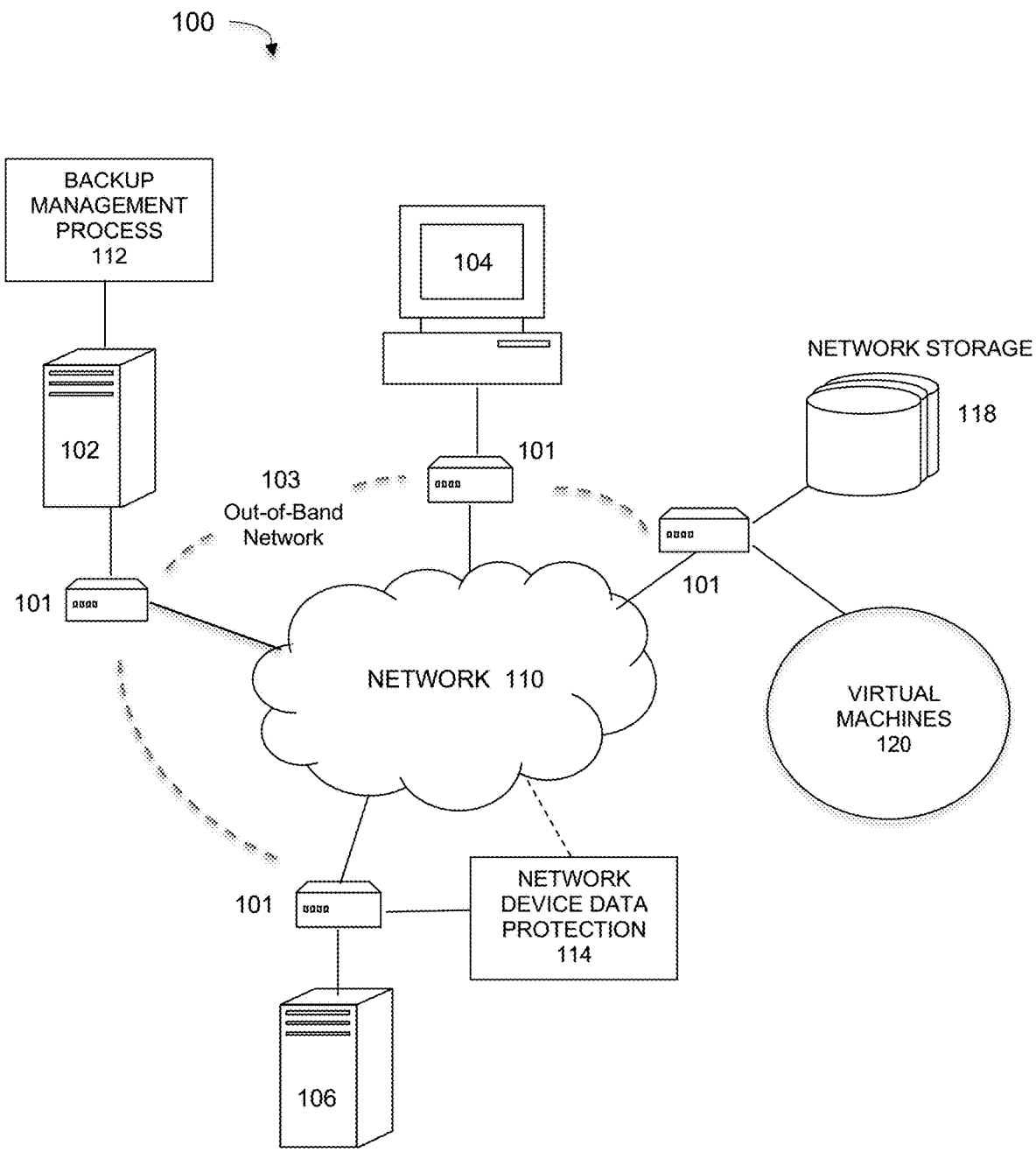
FIG. 1 illustrates a computer network system that applies data protection mechanisms to out-of-band network equipment devices, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a method and system of applying data protection software mechanisms to network equipment devices to auto-discover the networking equipment, save changes from memory (TCAM) to local storage, backup changes to protection storage, provide auditing and tracking history of changes, and provide the ability to deploy test/development copies of changes using software defined networking techniques.

FIG. 1 illustrates a computer network system that applies data protection mechanisms to out-of-band network equipment devices, under some embodiments. For network 100, a number of network resources, such as server computers 102, 106, desktop or portable computers 104, storage devices 118, and other similar system resources.

For the embodiment of FIG. 1, at least one server 102 may be a backup and/or storage server that executes a data storage or backup management process 112 that coordinates or manages the backup of data from one or more data sources to storage devices, such as network storage 118, client storage, and/or virtual storage devices 120. With regard to virtual storage, any number of virtual machines (VMs) or groups of VMs (e.g., organized into virtual centers) 120 may be provided to serve as backup targets. The VMs or other network storage devices serve as target storage devices for data backed up from one or more data sources, such as storage server 102 or other data source, in the network environment. The data sourced by the data source may be any appropriate data, such as database data that is part of a database management system, and the data may reside on one or more hard drives for the database(s) in a variety of formats.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 118, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The network server computers are coupled directly or indirectly to each other and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

For the embodiment of FIG. 1, each computer, storage device, or other resource is connected to network 110 or other resources through some sort of network equipment or interface device 101. Such as device may be switch, router, modem, load balancer, buffer, or some other similar device that conditions the data or otherwise facilitates interface of the computer (e.g., 102, 104, 106) with the network 110. The interface may be embodied as an external device, or it may be at least partially integrated with the computer itself.

In an embodiment, the network equipment devices 101 are part of an out-of-band network 103, which is an abstraction of the actual network connectivity among these devices to show that they are subject to out-of-band management protocols that involve the use of management interfaces or serial ports for managing and connecting this equipment. Such out-of-band management usually involves the use of a dedicated management channel for device maintenance. It allows a system administrator to monitor and manage servers and other network-attached equipment by remote control regardless of whether the machine is powered on, or whether an operating system is installed or functional, and is in contrast to in-band management that involves simply connecting to a switch using normal network connectivity. Out-of-band management allows the network operator to establish trust boundaries in accessing the management function to apply it to network resources, and to ensure management connectivity.

In system 100, the out-of-band devices 101 are characterized in that they are not on the same network as the rest of the data protection computer (e.g., 102) and media devices (e.g., 118). Though some of the hardware cabling and wiring infrastructure may be the same, they generally use different network systems and protocols. The network equipment devices 101 can also have unconventional access programmatical interfaces (e.g., Telnet or SSH), and they also have a unique process of committing items from memory to local storage as part of user operations. Consequently, and as stated above, certain issues are associated with managing both out-of-band and in-band network devices, such as failing to commit changes to local persistent storage, needing to manually replicate changes to external systems, and lack of audit/history tracking and test/development use case enablement.

Whereas data protection methods utilized by the computer and storage devices of FIG. 1 utilize certain data protection techniques that efficiently protect and restore data of filesystems (e.g., laptop/desktop), NAS devices, virtual machines and applications such as databases, such methods are not accessible by the network equipment in present, known systems. For system 100 of FIG. 1, one or more embodiments of a network device data protection process 114 apply certain data protection processes to the maintenance of network equipment devices 101. Embodiments of process 114 essentially apply application-consistent backup techniques, like databases, to network equipment devices 101. Such devices are unique in that a majority of them have a two-phase "commit" function. Unlike regular applications that are protected, network devices do not have the same interface or even data path that use normal workflows. Network devices are controlled via an out-of-band management network 103 that requires a different architecture than currently provided in present systems. Embodiments of the network device data protection process 114 can discover network devices on the network, assign policies to those network devices and then protect those devices; it also enables other use cases like audit tracking and copy reuse.

In an embodiment, process 114 provides a new set of software called data protection networking device (DPND), that is responsible for backing up and restoring configuration changes for all network devices 101. Other functionality such as audit tracking and test/development copies will be integrated at the protection software. It should be noted that process 114 may be provided as an executable software routine, hardware component, or other module that is provided with or as part of one or each interface device 101, or as a network 110 or cloud-based process. The DPND functionality can be provided as the network device data protection process 114 as a component (e.g., hardware or firmware) or as an executable program executed in network 110 or as part of any device 101 or computer 106 of system 100.

In an embodiment, network devices 101 (also referred to as "network equipment" or "network equipment device" or "network interface devices") can be considered any of the following: managed switches, core routers, firewalls, load balancers, and so on. For the purpose of description, embodiments will be generally described with respect to managed switches, however it should be noted that embodiments are not so limited and may include any type of network equipment, interface, or infrastructure device.

When a network device is first deployed or installed, it typically has what is referred to as a "day 0 configuration," which are default settings for the device set by the manufacturer or vendor. As stated above, configuration parameters depend on the type of device, and can include parameters such as: network (e.g., VLAN) tags, per port activation/link speed, domain routing protocol (e.g., BGP/OSPF) settings, firewall rules, high availability/redundancy settings, and so on.

For a managed switch, such configuration parameters can be static routes, default port assignments, and so on. During the course of normal operation, such configuration parameters are changed with frequency that depends on network size, activity, scalability, topography, and so on. Heavily used or critical switches and routers may be regularly reconfigured with new port assignments, firewall settings, operating characteristics (e.g., voice, data, etc.), firmware upgrades, patches, bug fixes, and so on. These changes can be done either manually by a technician or system administrator, or they may be performed by an automated updating procedure that implements changes per a defined policy. For out-of-band devices, such changes are typically made while the devices are on the network and active. Embodiments facilitate the saving of configuration changes on these devices to persistent memory storage using data protection techniques instead of the simple out-of-band network protocols.

Figure 2:
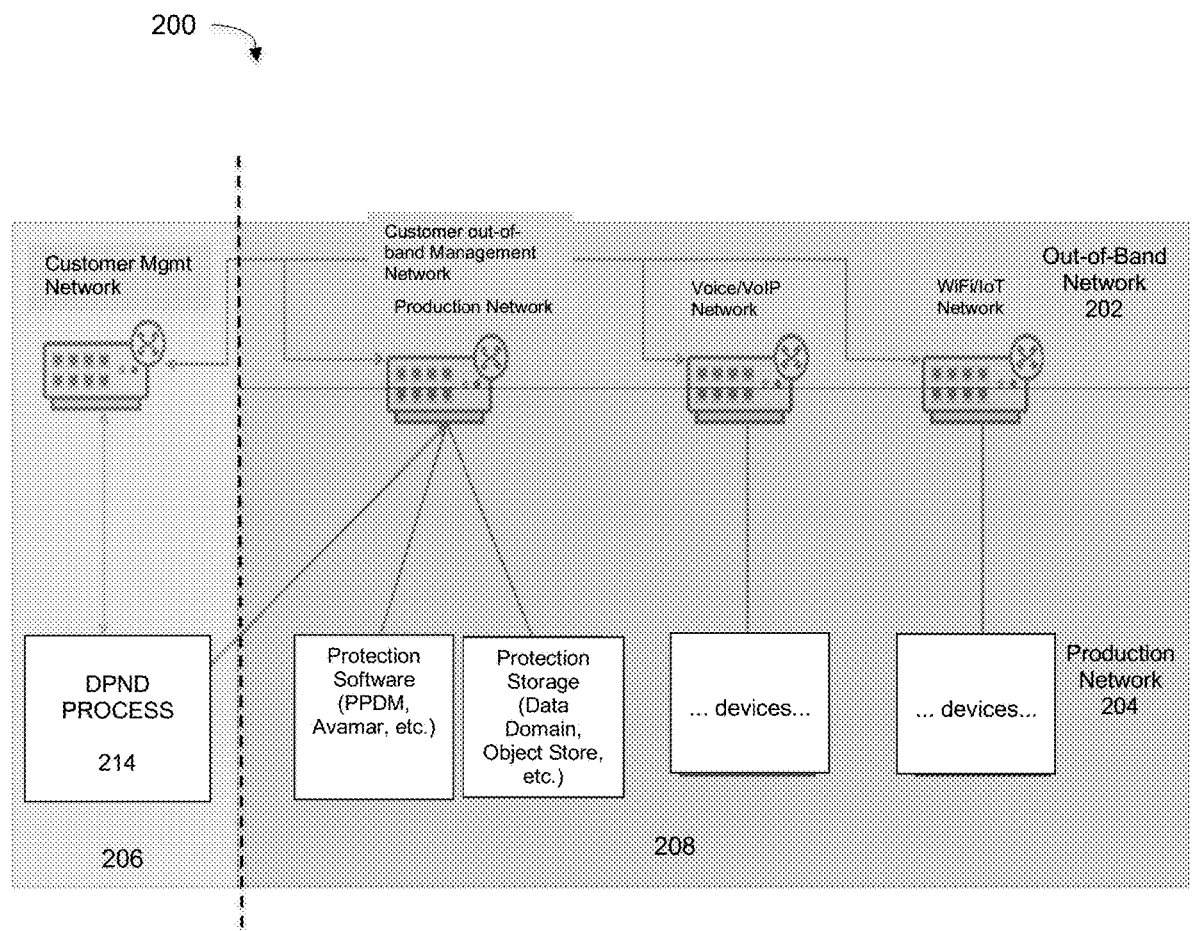
FIG. 2 illustrates an example user network that implements a data protection networking device process, under some embodiments.

FIG. 2 illustrates an example user network that implements a data protection networking device process, under some embodiments. System 200 represents a network comprising a number of user resources, such as production software, protection storage, client server computer, and devices in a production network 204. These resources are coupled to a network through network devices in out-of-band network 202, which is a secured and limited access network used to configure and monitor all network devices that is not accessible by the production network. Each network device (switch, router, firewall, etc.) has their management network port connected to the out-of-band network. The production network 204 is a series of networks that customers may sub-divide into. Three examples are shown for example as: production, Voice/VoIP and WiFi/IOT network, but embodiments are not so limited.

For the embodiment of FIG. 2, section 206 represents the network region where the DPND process 214 is installed. This is a dual-homed component or process in that it has access to both the out-of-band network 202 and the production network 204. Region 208 includes the resources and network devices that are managed by DPND process 214. The DPND process 214 may be deployed externally as a VM/physical device within the network or it could be embedded within one or more of the network devices. There may also be multiple instances of DPND in the customer network. The protection software and storage may be in the production network or in the out-of-band network, or it may even be hosted as a service. For purposes of description, DPND will be described as a single instance implementation that is dual homed (i.e., access to out-of-band and production network) and a local instance of protection software and storage, though embodiments are not so limited.

Each network device (e.g., managed switch, a firewall or router) usually has a different method for programmatic control. The traditional industry standard for such control has been Telnet, which is used to administer commands on devices through the use of command line interfaces (CLIs). Due to the insecurity of Telnet, best practices have led to network devices being put on restrictive 'management' networks, such as an out-of-band network. As security improved, other methods such as SSH (Secure Shell) and Rest APIs were added, but the practice of putting the management interface on an out-of-band network is still a viable solution.

Depending on the network device, model, version and the customer configuration, the DPND process is configured to support each of the following controlling interfaces: Telnet, SSH, ReST API, RestCONF, and vendor specific or similar protocols. In an embodiment, the DPND process supports a pluggable driver model which adds flexibility to handle a wide variety of network devices. Each driver will support a common set of use cases, such as: commit, backup, and restore operations.

Figure 3:
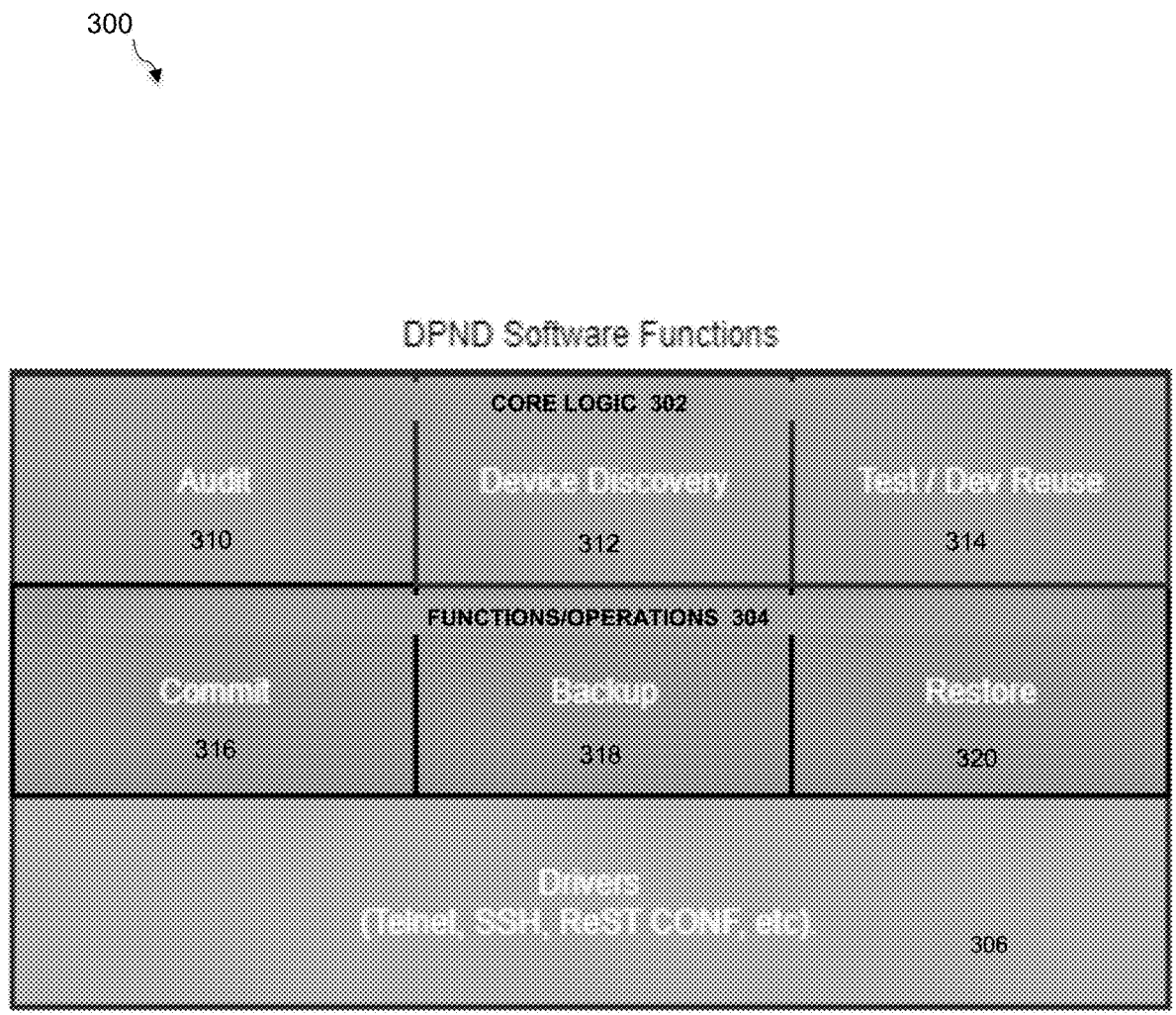
FIG. 3 is a sample driver model and implementation within the data protection networking device process software, under some embodiments.

FIG. 3 is a sample driver model and implementation within the DPND software, under some embodiments. The software model 300 of FIG. 3 comprises a core logic layer 302, a functions and operations layer 304 and a drivers layer 306. The drivers 306 represent drivers that support the interfaces listed above: Telnet, ReST, CONF, and so on. The functions/operations layer 304 comprise commit 316, backup 318, and restore 320 functions; and the core logic layer comprises certain applications such as audit 310, device discovery 312, and test/dev reuse 314, to be described in greater detail below.

Figure 4:
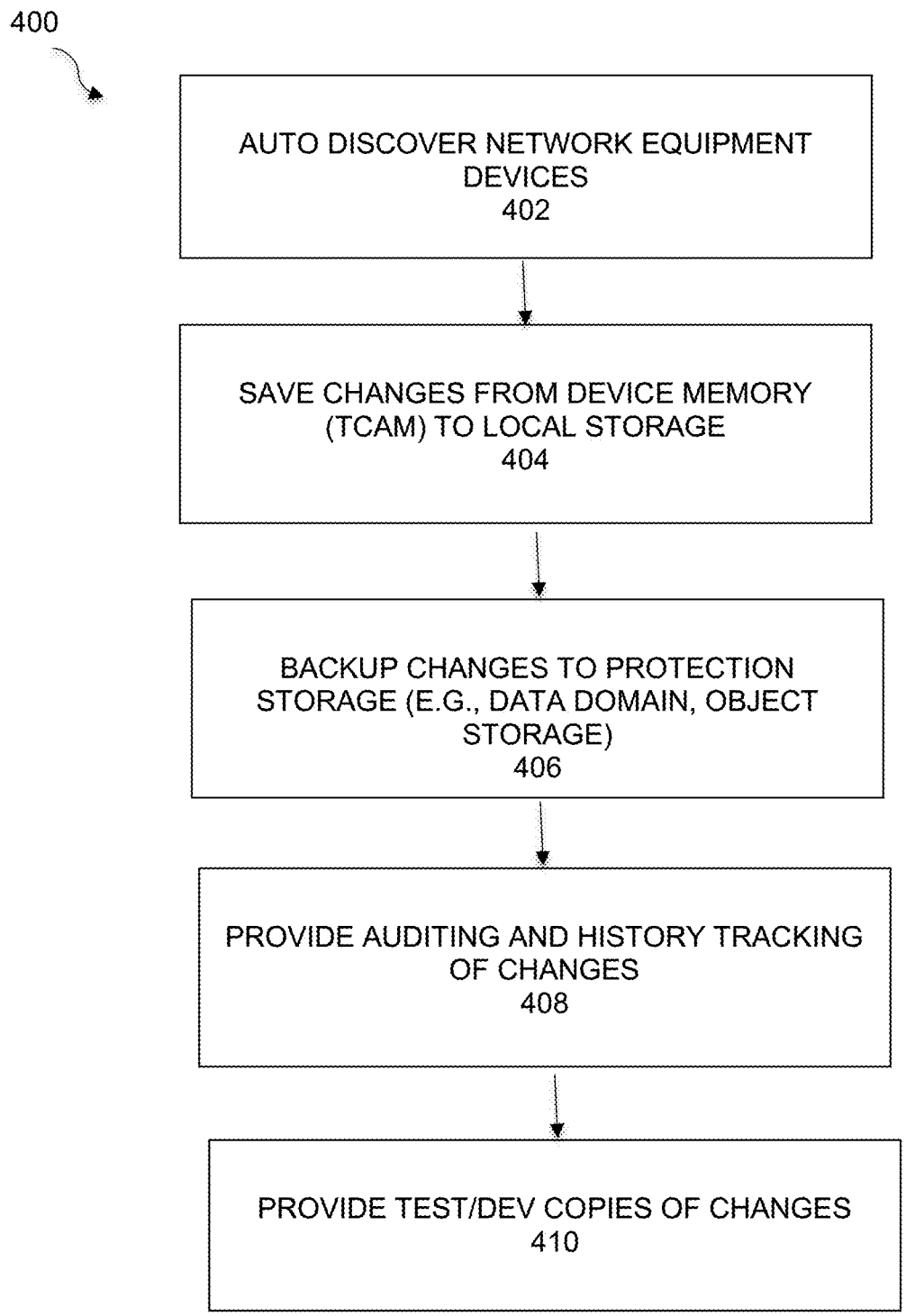
FIG. 4 is a flowchart that illustrates a method of network device data protection, under some embodiments.

FIG. 4 is a flowchart that illustrates a method of network device data protection, under some embodiments. As shown in FIG. 4, process 400 begins with auto-discovery of the network equipment devices in the network, 402. The changes for the discovered devices are then saved from their resident memory (e.g., TCAM) to local storage, 404. The changes are then backed up to protection storage, such as provided for normal data backup operations, 406. The process 400 also provides auditing and tracking history of changes, 408, and the ability to deploy test/development copies of changes using software defined networking techniques, 410. Detail regarding each of these processing steps will be provided in greater detail below.

As shown in FIG. 4, process 400 begins with auto discovery of network equipment devices, as well as policy assignment. Different methods of device discovery in networks currently exist. In an embodiment, the device discovery process uses an Address Resolution Protocol (ARP) broadcast method. In general, ARP is a communication protocol used for discovering link layer address (e.g., MAC address) of a given internet layer address for a device (e.g., IPv4 address). The ARP broadcast runs on the DPND process 214 of FIG. 2. The result of the ARP broadcast will be a list of MAC addresses and Internet Protocol (e.g., IPv4/IPv6) addresses for each network device discovered. In an embodiment, this discovery information is transmitted to the data protection software where it will used to populate a list of assets (network devices) to protect. Each asset can have policies applied to them that control how often to backup and how long data is archived.

Other discovery methods instead of ARP can also be used, such as Link Layer Discovery Protocol, Simple Service Discovery Protocol, Neighbor Discovery Protocol, or any other similar public or proprietary discovery protocol.

Each MAC (media access controller) address for every device manufactured worldwide is registered to a company as specified by IEEE Standards. Because of this worldwide requirement, the data protection software can determine, based on each MAC address, the identity of the vendor for the network device is and display it to the user. These vendors could include: Dell, Cisco, Fortigate, and so on. The vendor information can also be used as part of a policy definition. An example policy definition might be: all Dell switches should be protected every hour while every Cisco switch once a day. Table 1 below illustrates a sample table that could be populated by the DPDN process as part of its discovery operation, 402, under some embodiments.

TABLE 1

| MAC Address | IPv4/IPv6 Address | Vendor |
| --- | --- | --- |
| 00:00:97:00:00:00 | 10.255.255.21 | EMC |
| 00:06:5B:00:00:00 | 10.255.255.22 | Dell |
| 00:01:42:00:00:00 | 10.255.255.23 | Cisco |

Figure 5:
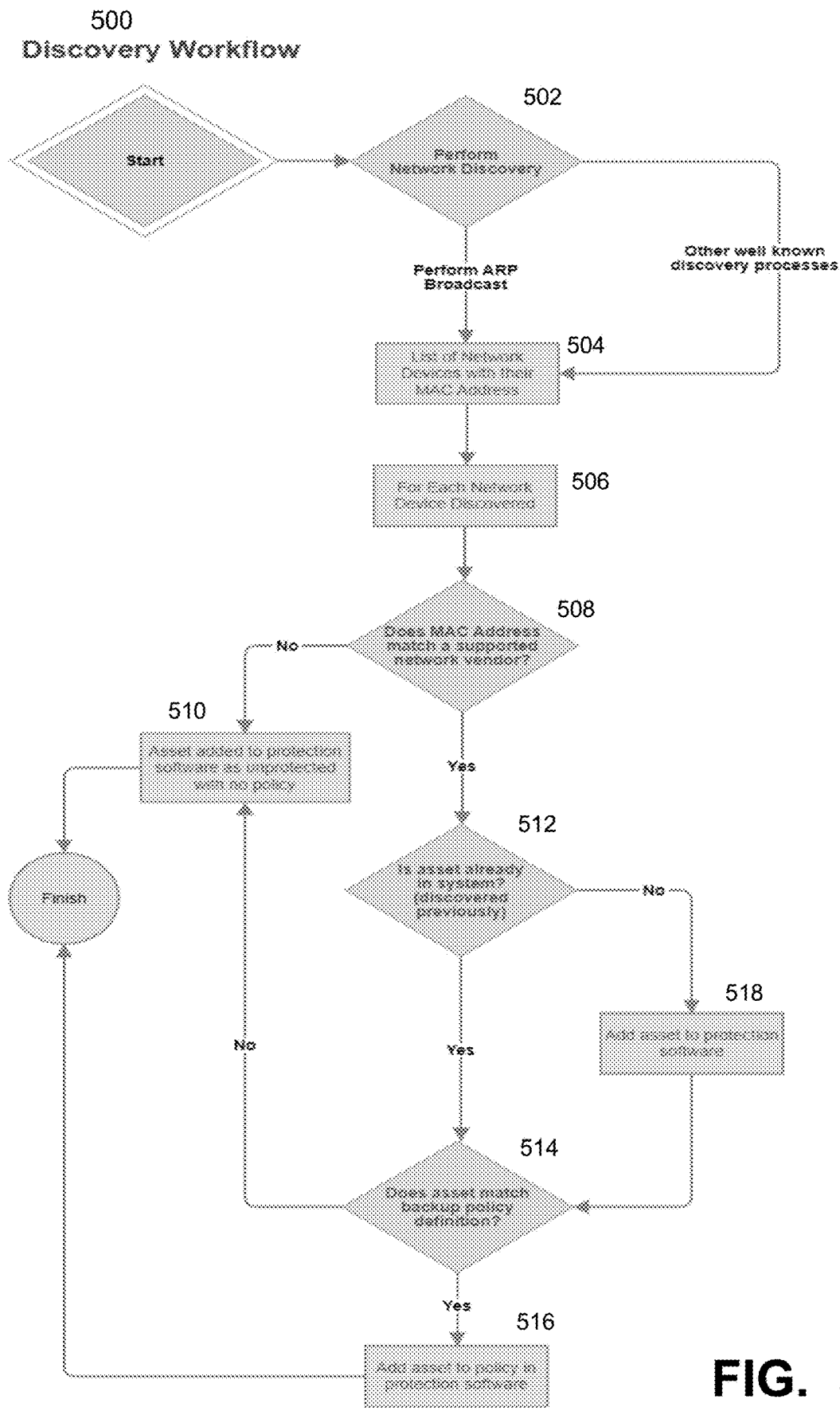
FIG. 5 is a flowchart illustrating a method of performing an auto-discovery process, under some embodiments.

FIG. 5 is a flowchart illustrating a method of performing an auto-discovery process, under some embodiments. Process 500 of FIG. 5 begins with initiation of the network discovery operation, 502. This can be implemented through either ARP broadcast techniques or other known discovery processes. The network discovery operation produces a list of network addresses and their respective MAC addresses 506. For each discovered network device 506, the process determines whether or not their MAC address matches a supported vendor, 508. If there is no match, the discovered network device is added as an asset to the data protection software as an unprotected device with no protection policy, 510. If, in step 508, it is determined that there is a match, the process next determines whether this device is already in the system as a previously discovered device, 512. If not, it is added as an asset to the data protection software 518. For previously discovered or newly discovered assets, the process then determines whether the asset matches a backup policy definition, 514. If it does match, the asset is added to the policy in the data protection software 516, and the process ends. If it does not match, the unmatched asset is added to the data protection software as an unprotected device with no policy, 510, before the process ends.

Once the discovery operation 500 is performed, the system has the following information: IP Address of Network Device and the MAC Address of the network device. With these two pieces of information, the process can figure out the device vendor (e.g., Cisco, Aruba, Arista, Dell, etc.) and map that to an existing or new protection policy. If there is additional discovery information, such as network switch OS version, open ports, and so on, these can be included as part of the decision making for policy matching.

In an embodiment, the protection policy for assets can be provided as a set of rules that specify various protection parameters for different vendors. Parameters can include elements such as protection period (e.g., hourly, daily, weekly, etc.), storage duration (e.g., one month, one year, etc.), protection storage device, and so on. Table 2 below illustrates a sample policy table that could be used for protection of assets based on device vendor, under some embodiments.

TABLE 2

| Vendor | Protection Period | Storage Duration | Protection Storage |
| --- | --- | --- | --- |
| EMC | Hourly | One Year | SSD Only |
| Dell | Hourly | Two Years | Virtual/HDD |
| Cisco | Daily | Two Years | Virtual/HDD |

In the above example of Table 2, the protection storage parameter could imply how fast a recovery is provided. For the example shown, the EMC devices are stored on SSD rather than HDD drives as the time to recover on SSD would be faster than HDD. Other parameters could also specify that the protection storage is on deduplication media or cloud/object based. In addition, there may be a selection of different inputs or IP addresses, rather than vendor. For example: all network devices on 10.255.255.0/24 could be protected on an hourly basis, stored for one year and stored on HDD; while all network devices on 10.10.10.0/24 could have a daily protection period, are stored for two years on virtual media, and so on. In general, any attribute that the discovery policy finds or discovers can be used to help drive and categorize the network device protection policies, and any appropriate number of parameters and associated protection policy rules can be implemented.

The DPND process 214 protects each network device that has been automatically discovered and added as an asset in the system. In an embodiment, the DPND process has the following unique capabilities: (1) communicating with each network device using a driver module (e.g., module 300); (2) saving and backing up the changes; (3) restoring the configuration to each device as needed; (4) audit and history tracking; and (5) enabling test/development copies.

With respect to the commit function for each driver, network devices typically have a two phase commit process. Such that changes on the network are first committed to resident memory of the network device, and then to local persistent storage of the network device. The resident memory is typically implemented as ternary content-addressable memory (TCAM). TCAM is a high-speed memory that stores data using three different inputs: 0, 1, and X to facilitate content searches in a single clock cycle. It is generally much faster than RAM memory, and is used in networking equipment to increase the speed of route lookups, packet classification and forwarding, and so on. During normal operation, changes made to the TCAM are live and applied to the network device. However if the network device reboots or loses power, any configuration in the TCAM is lost. The purpose of the commit function 316 for each driver is to save all configuration items from TCAM to the local persistent storage of the network device. Upon a reboot/power loss, the changes will be loaded from local persistent storage back to the device and thus will not be lost.

An example CLI command used to save the TCAM to local storage can be expressed as follows:

Sample save TCAM to local persistent storage:
$ configure
$ (configure): configuration copy running startup
$ (configure): configuration save running backup.xml While the sample command above uses the keyword "copy" and "save," the standard nomenclature considers this to be a commit. That is, committing all the live configurations to TCAM memory. For network devices that do not support the commit functionality, the DPND process will skip/ignore commit requests.

Once configuration changes are saved from TCAM to the network device local persistent storage, it is important to protect the configuration file and store a copy on protection storage. The purpose of the backup function 318 is to copy the local configuration file from the network device onto protection storage. The method of transporting the configuration file will vary depending on the protection storage. For example, if the protection storage is Data Domain, DPND might use DDBoost. If the protection storage is object storage from AWS, DPND might use an S3 library, and so on. The protection storage might offer unique capabilities like deduplication, encryption, and/or compression and DPND may use those capabilities.

The DPND process acts as a proxy or man in the middle, between the network device and the protection storage. Such a 3-way (man in the middle) solution comprises implementing the DPND process or component running or placed in between the network device and the protection storage. For this implementation, DPND is run outside the source on its own standalone machine. In an example system embodiment, the source (network device) is box 1, the proxy/man in the middle where DPND runs is box 2, and the protection storage (e.g., DataDomain, AWS object storage) is box 3. Alternatively, DPND can run inside the source (i.e., network device) which is more of a direct to storage model, or client-server model. The outside implementation is illustrated in FIGS. 6A and 6B with the DPND component/process functionally disposed between the network device and the protection storage.

Figure 6A:
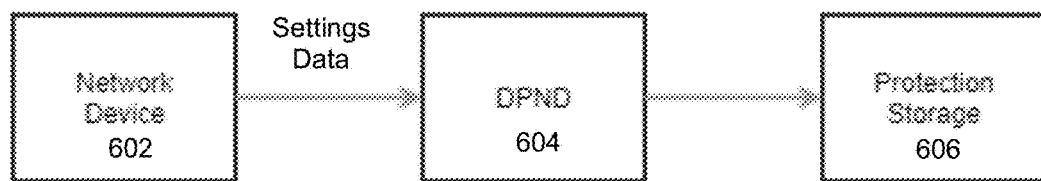
FIG. 6A is an example data flow diagram of the DPND backup function, under some embodiments.
Figure 6B:
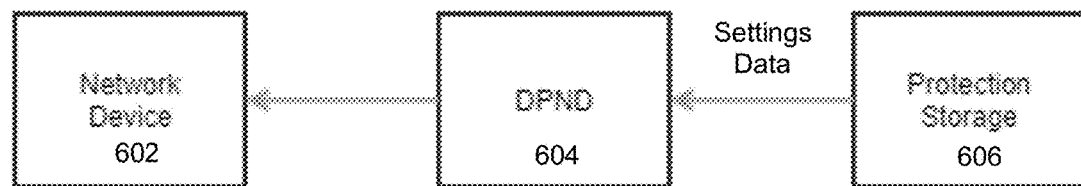
FIG. 6B is an example data flow diagram of the DPND restore function, under some embodiments.

FIG. 6A is an example data flow diagram of the DPND backup function, under some embodiments. For the backup function, the DPND process 604 is functionally coupled between the network device 602 and protection storage 606 and facilitates the copying of setting data from the network device (from its TCAM memory) to the protection storage.

In an embodiment, the DPND process 214 relies on data protection software within the system to perform orchestration of the backup. Thus, with reference to system 100 of FIG. 1, DPND process 114 uses the backup server 102 and backup management process 112 to perform the backup function. Alternatively, DPND could perform this functionality itself. This process may include providing schedules and retention periods, for example.

The restore function 320 replaces the existing configuration that was backed up from the network device back to the local persistent storage of the network device. Once configuration is placed, the restore command will provide an option to apply those settings to the live system. In some cases, network operators may want to only restore the configuration file but not apply them so further modifications can be made. In other cases, network operators will want those changed applied after they are restored to the device. Some network devices may not have the two stage commit process in which DPND with the pluggable driver model 300 will be forced to apply the settings to the live system after restore.

FIG. 6B is an example data flow diagram of the DPND restore function, under some embodiments. For the restore function, like the backup function, the DPND process 604 acts as a proxy or man in the middle between the protection storage 606 and the network device 602. In this case, the settings data is transferred from the protection storage 606 to be copied to or restored back on the network device 602. The same features of deduplication, encryption, and/or compression may also apply. Likewise, for the restore function, the DPND process 114 might also rely on system-wise data protection software 112, or it may use its own functionality. When restoring configuration data, DPND can restore to the data to the same device or to a new device. For example, in a disaster recovery scenario, placing the configuration on a different device than the original network device may be required.

As shown in FIG. 3, the DPND software functions diagram illustrate two additional pieces of core logic besides device discovery 312. These are the audit/tracking process 310 and the Test/Dev Reuse process 314.

With respect to audit and history tracking, due to the limited amount of system resources (CPU, Memory and Storage) found on network devices, advanced features such as tracking configuration changes or performing audit of changes in present known systems are limited or non-existent. If these system resources run out, this could cause the network device to crash and be unable to perform further management, or to operate in a degraded state. For this reason, audit and tracking features are often turned off or disabled to save network resource and thereby avoid potential network issues. In this case, a useful feature with regard to analyzing past system behavior is lost.

In an embodiment, the DPND function 300 includes an audit and history tracking process 310 that provides audit and tracking as part of its normal backup operations. If a user defines a policy to schedule backups every hour and a change is made, DPND enables viewing the history of the changes through the standard user interface (UI) workflows that exist within the data protection software, such as Avamar or PowerProtect Data Manager.

The audit tracking process 310 works by recording an entry in the audit database after a backup occurs. This audit database can be stored within the DPND process or it can be embodied as metadata of the backup. Either way, it can be treated like any other metadata and might be stored in a metadata catalog within the backup software. For example, filesystem metadata includes filenames, sizes of files, a/m/c time, and so on. Similarly, network device information, such as per-port configurations, switch access control lists (ACLs), routes, and so on, would be tracked in the audit database. As new backups occur, the audit database keeps track of each previous entry, along with the new entry and compares the results. If the results are the same, no additional information is stored. If the results are different, then a new entry is recorded in the audit database. This would include the updated value of that record, any additional properties like the user/timestamp who made the change (if available), along with backup details (e.g., when the backup occurred, etc.).

Over time, the audit database will have a list of entries for each feature for the network device, and a change list (audit trail) of what changed and when. When network administrators decide to restore backups, they will have the ability to see if a certain feature is present in a particular backup, or if a different date/time should be selected for the restore operation. It should be noted that most network devices store the configuration in a plain text human-readable file. This is either in a vendor proprietary format or an open standard, which is in human-readable plain text format. Parsers can then be used to understand and read this data.

Table 3 below illustrates a sample audit table for an audit database, under some embodiments.

TABLE 3

| DEVICE | CONFIGURATION | VALUE | BACKUP |
| --- | --- | --- | --- |
| 00-53-00-96-B7-41 | port 0 - VLAN | trunk | Monday Backup |
| 00-53-00-96-B7-41 | port 1 - VLAN | VLAN 10 | Monday Backup |
| 00-53-00-96-B7-41 | port 1 - VLAN | VLAN 200 | Tuesday Backup |
| 00-53-00-F3-A8-11 | port 20 - ACL | 20 permit IP 192.0.2.0/24 203.0.113.0 0.0.0.255 | Monday Backup |

In the above example of Table 3, the 'Device' column lists the unique address or identifier of the network device and can be an IP address, internal identifier, or MAC address, as shown. The 'Configuration' column is a small section of the configuration that is present in the audit table. For the example shown, the table specifies that for this switch, the port 0's VLAN information is provided, and Port 0 might have other information like ACLs or speed, and so on, which could be provided as separate entries in the table. The 'Value' column is the value for the point-in-time for that configuration entry. The 'Backup' column is backup in which the value exists. This could be a unique identifier that DPND or backup software creates. For example, the day of the week (Monday) is provided. However, other appropriate values may be used, such as time of day (e.g., 12:00 am), backup period (e.g., every hour), and so on. The format and content of Table 3 is provided for purposes of example only, and embodiments are not so limited. Any information, format, and content may be provided in an audit table as desired based on system configuration, constraints, and requirements.

With respect to the test/development reuse process 314, it is common for network operators to test out configuration in a lab or test environment before pushing changes to the actual production software product. These test environments can be physical or virtual with the use of Software Defined Networking (SDN). The DPND process 604 can facilitate these environments by restoring known states from a particular network device to an alternative device in the test network. With the DPND driver model, it could be extended to translate one backup format to another. For example, a backup of a Cisco device that can be restored to a RestCONF standard in SDN will enable data mobility via the backup software.

Figure 7:
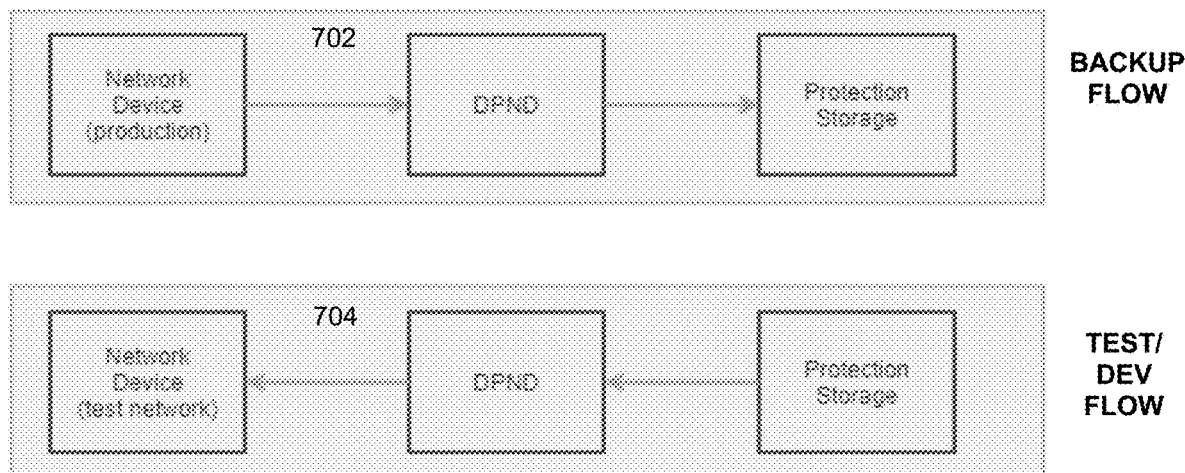
FIG. 7 is an example data flow diagram of the DPND test/development function, under some embodiments.

FIG. 7 is an example data flow diagram of the DPND test/development function, under some embodiments. This process comprises a backup flow 702 where the settings data is moved from the production network device through the DPND to the protection storage. The test/development flow 704 is the same as the restore data flow in that it goes from the protection storage back through the DPND to a network device. However, in this case, the target network device is different from the production network device the settings data was backed up from. Any appropriate target device can be selected, and it will be up to the network device to determine how to resolve any conflicts in different model versions.

In an embodiment, the test/development reuse process 314 is built on top of the audit function 310 in that restores can happen on a different network device than the one it was backed up from. The network administrator can choose to restore a backup to a different device, run the testing and make changes to that device, then back it up again. To push that configuration from a test/development environment to production, they can follow the same method of restoring the data, but this time to the production system rather than the test system. This solution is dependent on the vendor of the switch and backwards compatibility of configuration files. For example, if a user has the same make/model and device OS version in the production and test environment, then this would raise no problems. However, if any of these differ, it will be up to the user and vendor to fix any errors that might occur when doing the restore.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 8:
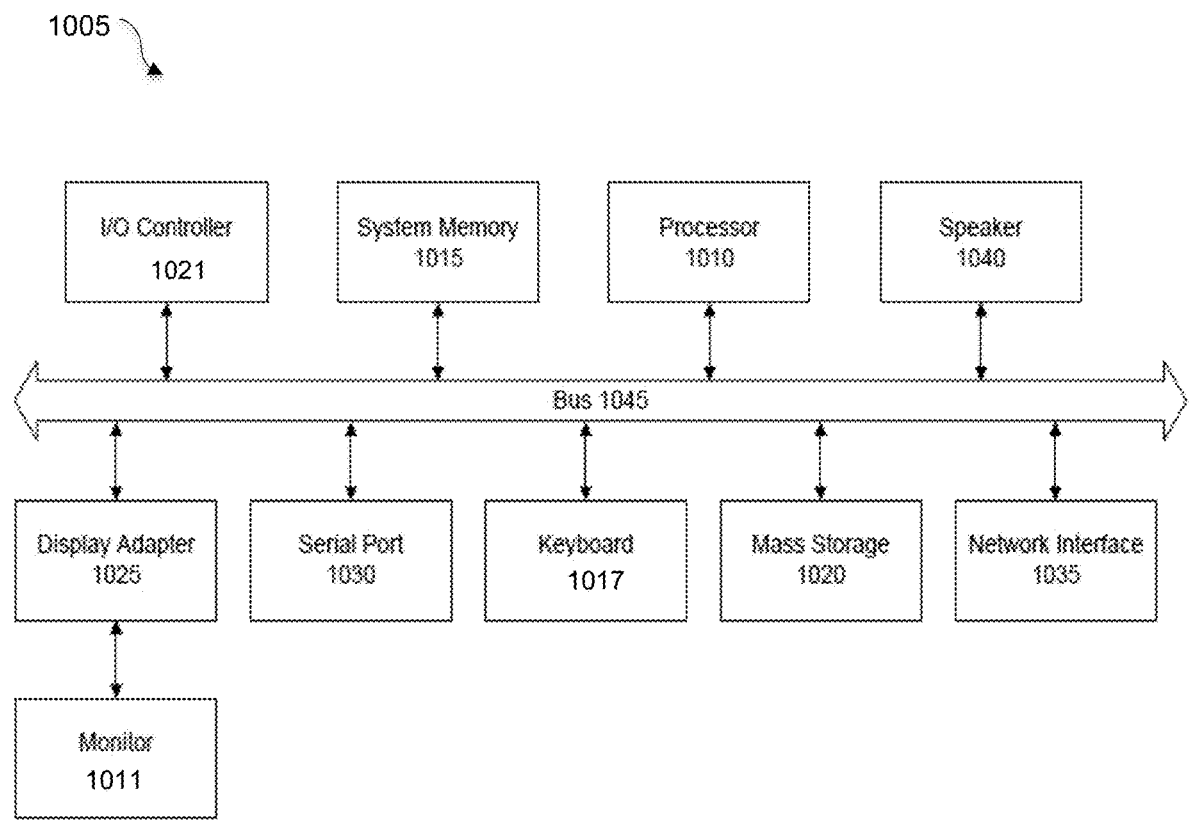
FIG. 8 is a system block diagram of a computer system used to execute one or more software components of the data protection networking device process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the systems and methods described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing data protection for a network equipment device, comprising:
deploying the network equipment device in an out-of-band network coupling together network equipment devices and implementing out-of-band protocols;
configuring a data protection networking device (DPND) to backup and restore configuration changes for the network equipment devices from a respective base configuration setting for each of the network equipment devices;
discovering the network equipment device through an auto-discovery process, wherein the base configuration and the configuration changes of the network equipment device are stored in resident memory for saving to local persistent storage in a commit operation, and that determines the Internet Protocol (IP) address of the network device and the media access controller (MAC) address of the network equipment device;
backing up the configuration changes of the network equipment device from the resident memory or the local persistent storage to a protection storage device by copying a local configuration file storing the configuration changes from the network equipment device to the protection storage through the DPND using a compatible transfer method of the protection storage device;

providing auditing and history tracking of the configuration changes;

facilitating deployment of test and development copies of the configuration changes using software defined networking;

determining a vendor of the network equipment device;

mapping the determined vendor to a new or existing protection policy; and applying the protection policy to the changes backed up to the protection storage device.

2. The method of claim 1 further comprising supporting a pluggable driver model to provide functions comprising the commit operation, a backup operation, and a restore operation.

3. The method of claim 2 wherein the network equipment device comprises a dual-homed device having access to both the out-of-band network and a production software network.

4. The method of claim 1 wherein the network equipment device is an interface device comprising one of: a managed switch, a router, a firewall, and a buffer.

5. The method of claim 4 wherein the resident memory for each network equipment device comprises a ternary content addressable memory (TCAM) device that uses three different inputs: 0, 1, and X to facilitate content searches in a single clock cycle.

6. The method of claim 3 wherein the network comprises the out-of-band protocol network and the production software network coupling a plurality of computers together for the execution of one or more applications.

7. The method of claim 1 wherein the discovery process comprises one of: an Address Resolution Protocol (ARP) process, a Link Layer Discovery Protocol, a Simple Service Discovery Protocol, or a Neighbor Discovery Protocol.

8. The method of claim 1 wherein the protection policy defines protection elements including: protection frequency and protection duration.

9. The method of claim 2 wherein the protection storage device comprises a Data Domain system, and the backup operation uses a Data Domain Boost process.

10. The method of claim 2 wherein the restore operation replaces an existing configuration stored in the protection storage device back to the local persistent storage of the network equipment device.

11. The method of claim 2 wherein the auditing and history tracking comprise recording an entry in an audit database after the backing up step, and wherein the audit database is embodied as metadata of the backup operation.

12. The method of claim 6 wherein the test and development copies of the configuration changes are restored to a different network equipment device than the discovered network equipment device.

13. The method of claim 12 wherein the different network equipment device comprises a device on the production network instead of the out-of-band network.

14. A system for providing data protection for a network equipment device, comprising:

an out-of-band network coupling together network equipment devices including the network equipment device, and implementing out-of-band protocols;

a data protection networking device (DPND) configured to backup and restore configuration changes for the network equipment devices from a respective base configuration setting for each of the network equipment devices;

a discovery component for discovering the network equipment device through an auto-discovery process, wherein the base configuration and the configuration changes of the network equipment device are stored in resident memory for saving to local persistent storage in a commit operation;

a backup component for backing up the configuration changes of the network equipment device from the resident memory or the local persistent storage to a protection storage device by copying a local configuration file storing the configuration changes from the network equipment device to the protection storage through the DPND using a compatible transfer method of the protection storage device; and a pluggable driver component for providing auditing and history tracking of the configuration changes, and facilitating deployment of test and development copies of the configuration changes using software defined networking, wherein the discovery process determines the Internet Protocol (IP) address of the network device and the media access controller (MAC) address of the network equipment device to further determine a vendor of the network equipment device, map the determined vendor to a new or existing protection policy, and apply the protection policy to the changes backed up to the protection storage device.

* * * * *